US012062280B2

(12) United States Patent
Kadar et al.

(10) Patent No.: US 12,062,280 B2
(45) Date of Patent: Aug. 13, 2024

(54) STOPPED VEHICLE DETECTION AND VALIDATION SYSTEMS AND METHODS (71) Applicant: FLIR Systems Trading Belgium BV, Meer (BE)

(72) Inventors: Ali Kadar, Marke (BE); Erwan Jouneau, Marke (BE); Stefan Schulte, Marke (BE)

(73) Assignee: FLIR Systems Trading Belgium BV, Meer (BE)

( * ) Notice: Subject to any disclaimer, the term of this patent is extended or adjusted under 35 U.S.C. 154(b) by 108 days.

(21) Appl. No.: 17/523,803

(22) Filed: Nov. 10, 2021

(65) Prior Publication Data
US 2023/0148351 A1 May 11, 2023

(51) Int. Cl.
| H04N 7/18 | (2006.01) |
| G06F 18/21 | (2023.01) |
| G06T 7/246 | (2017.01) |
| G06V 20/54 | (2022.01) |
| G08G 1/01 | (2006.01) |
| G08G 1/04 | (2006.01) |

(52) U.S. Cl.
CPC ......... *G08G 1/0145* (2013.01); *G06F 18/217* (2023.01); *G06T 7/246* (2017.01); *G06V 20/54* (2022.01); *G08G 1/0133* (2013.01); *G08G 1/04* (2013.01); *H04N 7/18* (2013.01); *G06T 2207/10048* (2013.01); *G06T 2207/20084* (2013.01); *G06T 2207/30236* (2013.01); *G06V 2201/08* (2022.01)

(58) Field of Classification Search
None
See application file for complete search history.

(56) References Cited

U.S. PATENT DOCUMENTS

| 9,390,333 | B2 | 7/2016 | Varghese |
| 9,460,613 | B1 * | 10/2016 | Whiting ............... G06V 10/764 |
| 10,051,246 | B2 | 8/2018 | Su et al. |
| 2012/0224746 | A1 | 9/2012 | Cobb et al. |
| 2020/0098268 | A1 * | 3/2020 | Winzell ................. G08G 1/165 |
| 2021/0201070 | A1 * | 7/2021 | Omari ................. G01C 21/3635 |

OTHER PUBLICATIONS

Multiscale Parametric Background Model for Stationary Foreground Object Detection (Year: 2007).*
Cheng, Steven et al., "A Multiscale Parametric Background Model for Stationary Foreground Object Detection", IEEE Workshop on Motion and Video Computing, Feb. 2007.
Li et al., "Multi-Granularity Tracking with Modularlized Components for Unsupervised Vehicles Anomaly Detection," IEEE/CVF Conference on Computer Vision and Pattern Recognition Workshops (CVPRW), Jun. 2020, pp. 2501-2510, Seattle, WA, United States of America.

* cited by examiner

*Primary Examiner* — Samuel D Fereja
(74) *Attorney, Agent, or Firm* — Haynes and Boone, LLP (57) ABSTRACT

Systems and methods for verifying stopped traffic and/or fallen object alarms include an image sensor configured to capture a stream of images of a traffic scene, a stopped object component configured to identify a stopped object in the captured images, define an associated object location in the captured images, and classify the detected object. A background modeling system models at least two background images, a slow background image and a fast background image. A DNN is trained to receive the object information and background images to verify the alarm condition.

17 Claims, 10 Drawing Sheets

STOPPED VEHICLE DETECTION AND VALIDATION SYSTEMS AND METHODS

TECHNICAL FIELD

The present application relates generally to traffic systems and, more particularly for example, to traffic sensing and/or monitoring systems and methods for analyzing a traffic scene.

BACKGROUND

Traffic control systems often use sensors to detect vehicles and other objects to help mitigate traffic congestion and improve safety. These sensors range in capabilities from the ability to simply detect vehicles in closed systems (e.g., provide a simple contact closure to a traffic controller) to those that are able to classify (e.g., distinguish between bikes, cars, trucks, etc.) and monitor the flow of vehicles and other objects (e.g., pedestrians, animals, etc.).

Within a traffic control system, a traffic signal controller may be used to manipulate the various phases of traffic signal at an intersection and/or along a roadway to affect traffic signalization. These traffic control systems are typically positioned adjacent to the intersection/roadway they control (e.g., disposed upon a traffic signal pole). Traffic control systems generally comprise an enclosure constructed from metal or plastic to house electronic equipment such as a sensor (e.g., an infrared imaging camera or other device), communications components, and control components to provide instructions to traffic signals or other traffic control/monitoring devices.

The operation of the traffic signal may be adaptive, responsive, pre-timed, fully-actuated, or semi-actuated depending upon the hardware available at the intersection and the amount of automation desired by the operator, such as a municipality. Sensors such as cameras, loop detectors, or radar may be used to detect the presence, location and/or movement of one or more vehicles. For example, video tracking methods may be used to identify and track objects that are identifiable in a series of captured images. In response to one or more vehicles being detected, a traffic signal controller may alter the timing of the traffic signal cycle, for example, to shorten a red light to allow a waiting vehicle to traverse the intersection without waiting for a full phase to elapse or to extend a green phase if it determines an above-average volume of traffic is present and the queue needs additional time to clear.

Some systems are configured to detect traffic anomalies and implement appropriate responses. For example, a traffic accident, stopped vehicle or fallen object may cause significant traffic congestion that may be mitigated by altering traffic control signals and/or dispatching emergency personnel. In some systems, for example, stopped vehicles or fallen objects may be detected by the traffic control system using a computer vision system. However, such systems often result in false detections/alarms due to various possible artifacts such as shadows, blooming effects due to headlights, tire-tracks in snowy or muddy landscapes, changing daylight conditions, flickering streetlights, waving trees due to winds, and other conditions that may trigger false alarms.

In view of the foregoing, there is a continued need for improved traffic control systems and methods that more accurately detect and monitor traffic in real-time applications.

SUMMARY

Improved traffic sensing and monitoring systems and methods are disclosed herein. In various embodiments, intelligent traffic applications are configured to detect traffic anomalies in real-time or near real-time scenarios. It is observed that when a traffic accident or other significant deviation in the traffic occurs, a vehicle or other object that may have stopped abruptly can be detected as an object that remains stationary in a captured image stream for a period of time. Example traffic monitoring systems disclosed herein include an image capture system providing image analysis using background modeling, a stop alarm, a fallen object alarm, and a deep neural network (DNN) inference model for validating stop and fallen object alarms. The alarm validation systems and methods disclosed herein result in a robust methodology for detecting stopped/fallen objects with minimal false alarms. These approaches generate accurate stopped vehicle/fallen object alarms and are able to run in real-time (or near real-time), even on resource constrained camera hardware.

In various embodiments, a traffic system monitors a traffic scene and is configured to automatically detect and track objects in the traffic scene. The traffic system may include one or more sensors (e.g., an optical image sensor, an infrared image sensor, etc.) configured to capture images of the traffic scene. The detected/tracked objects may include vehicles, trucks, pedestrians, cyclists, and/or other objects of interest.

In some embodiments, a system includes an image sensor configured to capture a stream of images of a scene, an object tracker configured to identify an object in the captured images and define an associated object location in the captured images, a stopped traffic detector configured to trigger a stop event if an object in the stream of images is determined to be stationary, a background modeling system configured to generate at least one background image of the scene, and a stop validator configured to, in response to receiving notification of a stop event, confirm that a location that triggered the stop event is associated with a detected stationary object.

The image sensor may include a visible light sensor configured to generate a stream of visible light images of the scene, a thermal image sensor configured to generate a stream of thermal images of the scene, and/or other sensor systems configured to generate data associated with objects and/or a background of the scene. The object tracker may be implemented using image processing and computer vision techniques as known in the art, including a pixel tracker configured to monitor changes in pixel values (e.g., contrast). The system may trigger the stop event based on detected changes in the pixel values that exceed certain threshold conditions. In other embodiments, the object tracker may be configured to track and classify objects from the sensor data and may include a neural network configured to receive captured image data and output an object classification, confidence factor, and/or object location in a corresponding captured image.

The stopped traffic detector may be further configured to define a region of interest in the image of the scene and configure a plurality of micro-sensors in the region of interest, wherein each micro-sensor is implemented as a state machine. The stop event may be triggered if a presence of a stationary object is detected in the region of interest based at least in part on variance values of the micro-sensors within a bounding box of the stationary object.

In some embodiments, the background modeling system is configured to receive a stream of input image frames and generate a plurality of background images comprising substantially static portions of the image. The plurality of background images may include a first background image tracking a background over a first period of time and a second background image tracking a background over a second period of time, wherein the first period of time is less than the second period of time.

In some embodiments, the system may further include a fallen object event detector configured to trigger a fallen object event if an object in the stream of images is determined to be stationary. The stop validator and/or fallen object validator may be implemented as one or more trained neural network models configured to, in response to a detected stop/fallen object event, validate the event by detecting a stationary object at the location of the detected event. In some embodiments, the object tracker is further configured to process one or more of the background images to detect stationary objects with a higher degree of confidence, thereby reducing the number of missed alarms.

In various embodiments, a method includes capturing a stream of images of a scene, identifying, using an object tracker, an object in the captured stream of images, triggering, by a stopped traffic detector, a stop event if an object in the stream of images is determined to be stationary, modeling at least one background image of the scene, and confirming, by a stop validator in response to receiving notification of the stop event, that a location that triggered the stop event is associated with a detected stationary object. The method may further include detecting a fallen object event if an object in the stream of images is determined to be stationary.

The method may further include defining a region of interest in the image of the scene and configuring a plurality of micro-sensors in the region of interest as a plurality of state machines. Triggering the stop event if a presence of a stationary object is detected in the region of interest may be based at least in part on variance values of the micro-sensors within a bounding box of the stationary object.

In some embodiments, the method further includes receiving a stream of input image frames and generating a plurality of background images comprising substantially static portions of the image. The plurality of background images may include a first background image tracking a background over a first period of time and a second background image tracking a background over a second period of time, wherein the first period of time is less than the second period of time.

In some embodiments, the step of confirming, by a stop validator in response to receiving notification of the stop event, that a location that triggered the stop event is associated with a detected stationary object may be performed by one or more trained neural network models configured to, in response to a detected stop/fallen object event, validate the event by detecting a stationary object at the location of the detected event. In some embodiments, the method may further include tracking objects through one or more of the background images to detect stationary objects with a higher degree of confidence, thereby reducing the number of missed alarms.

The scope of the present disclosure is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Aspects of the disclosure and their advantages can be better understood with reference to the following drawings and the detailed description that follows. It should be appreciated that like reference numerals are used to identify like elements illustrated in one or more of the figures, where showings therein are for purposes of illustrating embodiments of the present disclosure and not for purposes of limiting the same. The components in the drawings are not necessarily to scale, emphasis instead being placed upon clearly illustrating the principles of the present disclosure.

DETAILED DESCRIPTION

Traffic infrastructure systems and methods with improved object detection and tracking are disclosed herein. In various embodiments, a traffic monitoring system includes an image capture component configured with an image sensor (e.g., a visual image sensor and/or a thermal image sensor) to capture video or images of a traffic scene. The system is configured to analyze captured images to detect traffic anomalies, such as stopped vehicles and fallen objects. Detection of anomalies in intelligent traffic applications often plays a critical role in urban and inter-urban traffic analysis. It is observed that when a traffic accident occurs or there is a significant deviation in the traffic (for example due to a fallen object from ongoing traffic) a vehicle and/or an object may stop abruptly and remain stationary in the video for a significant period of time, allowing for detection of the traffic event.

In various embodiments, the traffic monitoring system includes a stopped traffic alarm and a fallen object alarm, which are configured to analyze captured images (and optionally other sensor data, if available) and trigger an alarm if stopped traffic (e.g., stopped automobile, motorcycle, pedestrian, etc.) or fallen object is detected. A background modeling component and one or more DNN inference models (or other machine learning models as appropriate) are configured to validate the stopped traffic alarm and fallen object alarm. For example, the stopped traffic alarm and fallen object alarm may be implemented using a computer vision-based stopped vehicle/fallen object identification algorithm as known in the art, which may include for example, monitoring the status of a plurality of micro-sensors associated with the scene. Without validation, such algorithms may result in a high frequency of false alarms due to various possible artifacts such as shadows, blooming effects due to headlights, tire-tracks in snowy or muddy landscapes, changing daylight conditions, flickering streetlights, waving trees due to winds, and other conditions. In the present disclosure, the alarms from one or more sensitive computer vision-based approaches are validated using dedicated background image modeling and trained validation inference models on the corresponding background image results. The results are robust systems and methods for detecting stopped traffic/fallen objects with less false alarms and reduced reaction speed (e.g., allowing a human operator to react faster to a traffic anomaly than with conventional systems). The approaches disclosed generate accurate predictions and are able to run in real-time (or near real-time) on resource constrained camera hardware.

The systems and methods of the present disclosure are capable of validating stop alarms triggered by a sensitive external system (for example a traditional computer vision-based approach) thereby reducing false alarms. These approaches may be used to track road users (e.g., pedestrians, bicycles, and vehicles), and may also be used to detect and classify other objects of interest (e.g., fallen cargo boxes) which are recognized by the inference engine used for validation. The systems and methods can be potentially used for not only reducing the number of false alarms but also for reducing the number of missing alarms by running the DNN inference engine on one or more background images at regular time intervals and analyzing resulting confidence values to determine whether to take an action.

The systems and methods of the present disclosure may be used in a variety of applications, including identifying stopped vehicles or fallen objects on lanes, highways, roads, or other traffic areas to prevent traffic disruption. In a security application, the system may be used to identify whether a vehicle or other object has stopped in an undesired location (e.g., private premises, entrance of buildings/facilities, etc.). In some systems, the background image(s) can be used for image analytics (e.g., scene mapping), image compression, and other image processing tasks.

The systems and methods may also be used in various traffic monitoring applications. Traffic operators, for example, are responsible for the general operation of the road infrastructure. The traffic operators are tasked with ensuring the traffic infrastructure works as expected to control the traffic flow and handle detected incidents in a correct way. In various traffic video detection systems, a traffic operator is alerted by the stopped traffic detection system and/or fallen object detection system together with visual verification through corresponding video about the event. The traffic operator can then select an appropriate scenario, e.g., sending a traffic alert notification, updating a variable message road sign, informing emergency personnel, or other appropriate actions. Too many false alarms from a video detection system can place a heavy burden on the traffic operator as they may need to review and visually verify each alarm. This diverts time from other tasks which should get more attention, for example, managing the traffic flow. The systems and methods disclosed herein provide a significant reduction in the number of false alarm events over conventional systems, resulting in less of a burden on personnel such as traffic operators.

Figure 1:
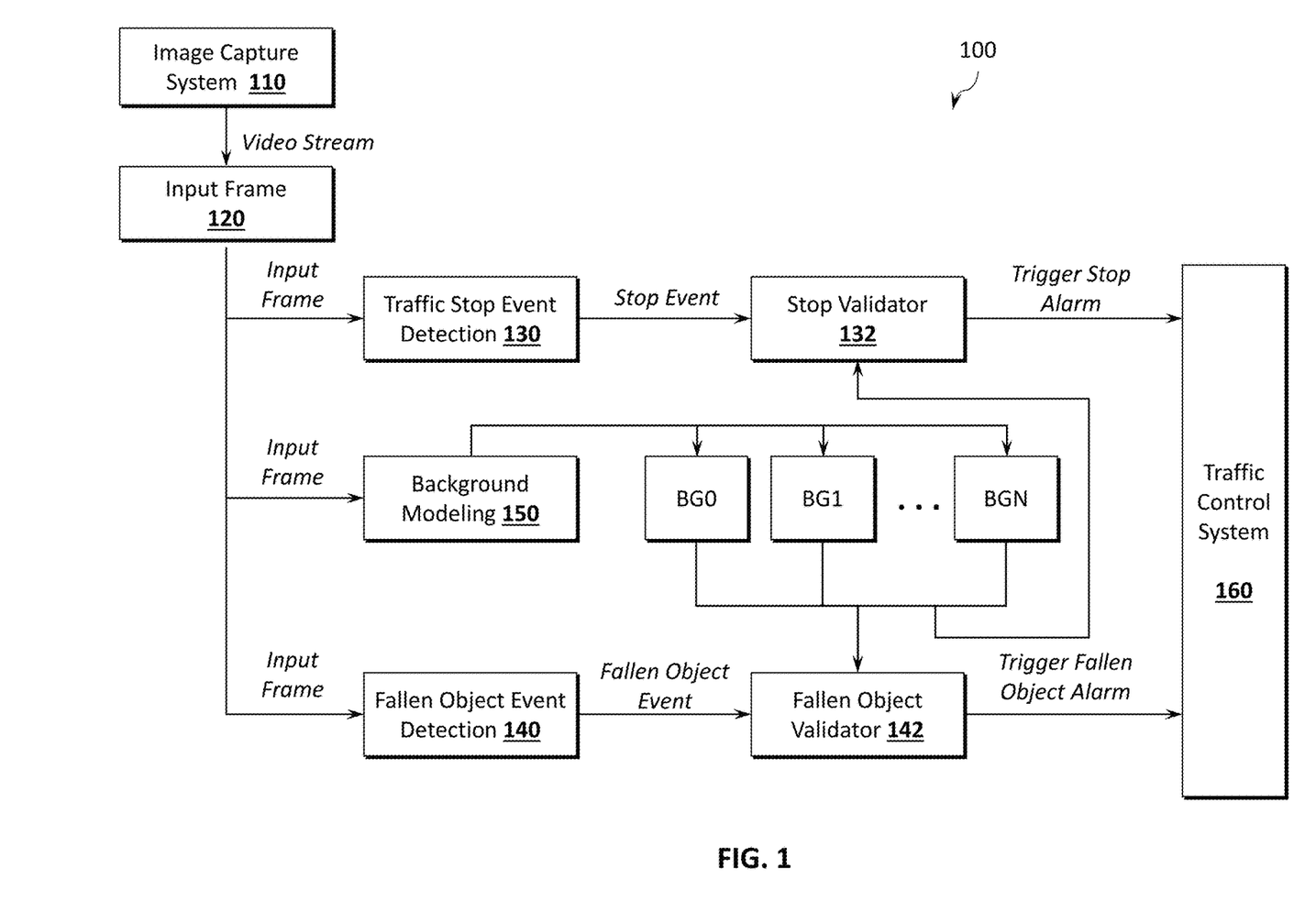
FIG. 1 illustrates an example alarm validation system, in accordance with one or more embodiments.

Embodiments of the present disclosure will now be described in further detail with reference to the figures. FIG. 1 illustrates an example alarm validation system 100, in accordance with one or more embodiments. As illustrated, the alarm validation system 100 is a modular system including a plurality of subcomponents. The alarm validation system 100 may operate on one or more processing systems, such as cloud computing system, an image capture device (e.g., camera hardware), an edge device of a traffic monitoring system, and/or other computing system.

In the illustrated embodiment, an image capture system 110 captures a stream of images of a scene (e.g., a traffic monitoring system capturing images of traffic on a roadway). The stream of images is processed by various components of the alarm validation system 100, which may process one input frame at a time. The image capture system 110 may be implemented as a visible light camera, an infrared camera, and/or other image capture device. The image capture system 110 feeds the sequence of images to the alarm validation components, which may be implemented on the image capture system 110, another local processing system, a networked system, a cloud system, or other processing system.

In various embodiments, the alarm validation components may process each input frame received from the image capture system 110, or a subset of frames from the input stream, e.g., to facilitate processing in real time. The video stream may comprise raw video, compressed video using one or more standard video formats, a series of individual image frames, upscaled/downscaled images, images in other formats, and/or other sensor data as appropriate. An optional input frame component 120 extracts input frames from the video stream and performs conversions (e.g., format, frame rate, etc.) or image manipulations (e.g., size, color depth) to place the images in a suitable format for processing by the alarm validation system 100.

Each input frame is passed to a traffic stop event detection component 130, a fallen object event detection component 140, and a background modeling component 150. The traffic stop event detection component 130 is configured to analyze a series of input frames and detect stopped traffic. Any computer vision-based traffic stop event detection algorithm may be used that is configured to detect stopped traffic and output an alarm (e.g., stop event), and may be implemented using various image processing and analysis algorithms, machine learning algorithms, trained neural networks, or other approaches. In one implementation, the traffic stop event detection component 130 may be configured to define a region of interest in the image of the scene and a plurality of micro-sensors in the region of interest, which are implemented as state machines. In this implementation, the stop event may be triggered if a presence of a stationary object is detected in the region of interest based at least in part on variance values of the micro-sensors within a bounding box of the stationary object.

In some embodiments, the traffic stop event detection component 130 is implemented as a trained neural network model configured to receive the sequence of input frames, track objects detected in the input frames, classify the detected objects, detect a stopped object (e.g., an object that hasn't moved for a period of time, such as 10 second), and output an alarm condition (e.g., a stop event signal). In various embodiments, the trained neural network may output a location of the stopped object in the image (e.g., via a bounding box) and/or in real world coordinates, one or more confidence values associated with the interference outputs, and other relevant information.

The fallen object event detection component 140 is configured to analyze a series of input frames and detect a fallen object. Any computer vision-based fallen object event detection algorithm may be used that is configured to detect fallen objects in an image and output an alarm (e.g., fallen object event), and may be implemented using various image processing and analysis algorithms, machine learning algorithms, trained neural networks, or other approaches. In one implementation, the fallen object event detection component 140 may be configured to define a region of interest in the image of the scene and a plurality of micro-sensors in the region of interest, which are implemented as state machines. In this implementation, the fallen object event may be triggered if a presence of a stationary object is detected in the region of interest based at least in part on variance values of the micro-sensors within a bounding box of the stationary object.

In some embodiments, the fallen object event detection components 140 may be implemented using a similar approach as used in the traffic stop even detection, with training and tuning to detect a fallen object (as opposed to stopped traffic). For example, both the traffic stop event detection component 130 and the fallen object event detection component 140 may be implemented using embedded deep learning-based object detectors trained to detect objects in the input frames, determine the locations of each detected object (e.g., defining a bounding box for each detected object) and classify each detected object (e.g., pedestrians, bicycles, vehicles, etc.). One difference between the stopped traffic and fallen object algorithms is that the stopped traffic algorithm detects a well-defined class of objects (e.g., automobiles, motorcycles, pedestrians) with predictable movements (e.g., a vehicle traveling down a road, in a traffic lane, at the speed limit). These objects may be tracked through the scene allowing movement anomalies to be quickly detected. The fallen object algorithm, by contrast, can be any object and its presence is often unexpected. Thus, the configuration and training of the algorithms are optimized for the different object classes.

The background modeling components 150 comprise one or more background modeling algorithms configured to receive the series of input frames and output a plurality of background images (BG0, BG1, . . . , BGN). In the illustrated embodiment, the various background images represent background images determined over various time frames, including a background image generated during a short timeframe (e.g., 5 second) and a background image generated during a longer timeframe (e.g., 10 minutes). The background modeling components 150 may also be configured to output background images modeled over one or more intermediate timeframes (e.g., BG1). In various embodiments, the background modeling components 150 are configured to capture the static part of a scene over the relevant timeframe, which may include a stopped vehicle or fallen object, depending on the time period associated with the background image.

In some embodiments, the background modeling components 150 may be configured to detect stopped traffic and/or a fallen object, for example, by comparing background images generated over different time intervals. This approach provides an additional level of detection by comparing a long background image to a short background image and detecting the difference. A stopped vehicle or fallen object will eventually be part of the background image, but the identification of a stationary object and/or sequence of detections within the background images may be used to trigger an alarm.

Figure 2:
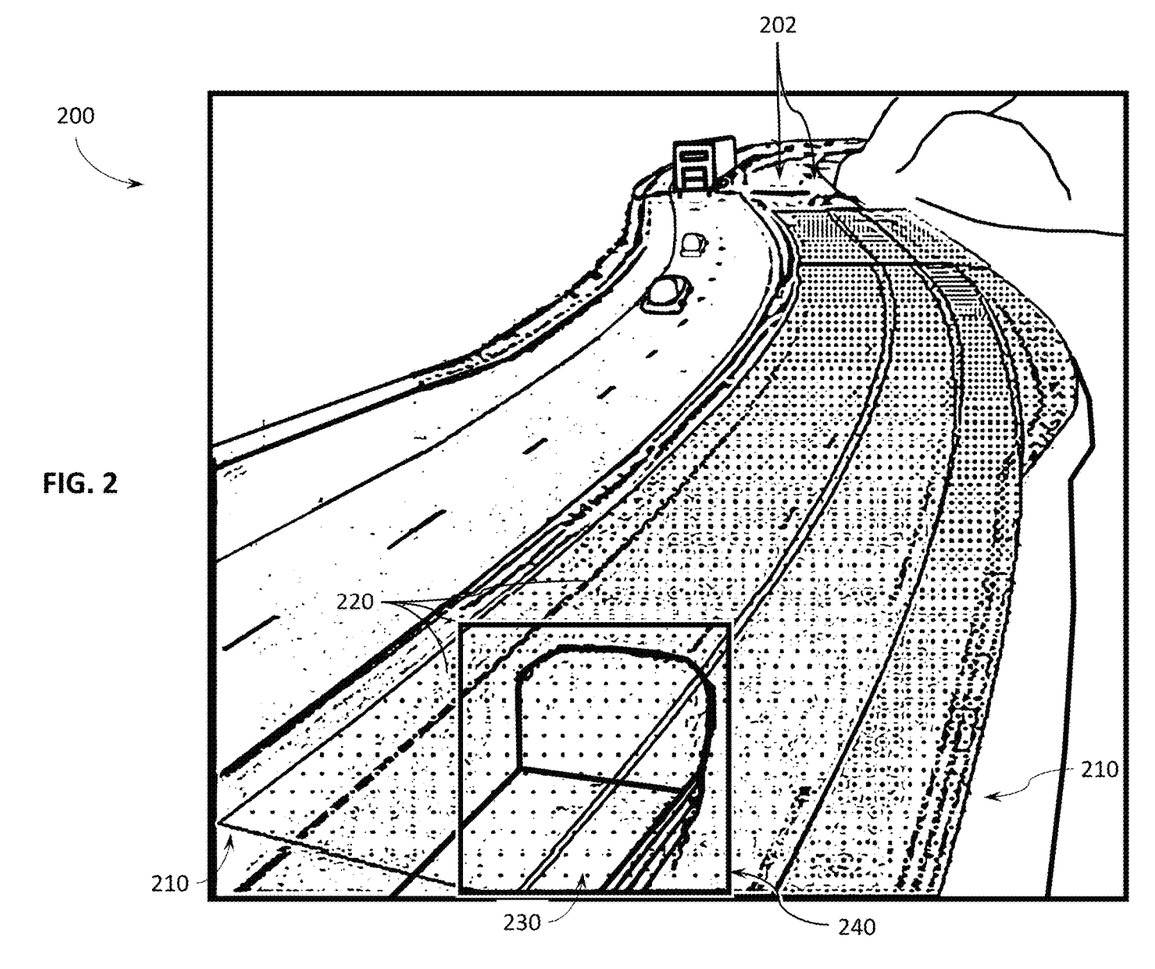
FIG. 2 illustrates an example traffic scene, in accordance with one or more embodiments.

An example traffic scene 200 is illustrated in FIG. 2. As illustrated the scene 200 may cover traffic lanes (e.g., traffic lanes 202) and cross sections, and include a pool of micro-sensors 220 which are intelligently distributed over the region of interest 210. As illustrated, each micro-sensor 220 is depicted as a dot in a bounded region of interest 210 covering portions of the traffic lanes 202 visible to the camera. In operation, each micro-sensor 220 may be defined as a state machine. When a moving object (e.g., truck 230 or another vehicle) stops in the region of interest 210, the state of the micro-sensors 220 associated with the area covered by the bounding box 240 of the stopped object changes triggering an alarm.

In various embodiments, the parameters of the stop/fallen object algorithms are configurable and may be fine-tuned based on characteristics of the scene 200 (e.g., a minimum number of micro-sensors needed to trigger an alarm, threshold values to trigger an alarm, changes to parameters based on weather conditions or lighting conditions, etc.). In some embodiments, the parameters are set such that the stop/fallen algorithms are sensitive to reduce the number of missed alarms, and the alarm validation algorithms are implemented to reduce the number of false alarms.

Figure 3:
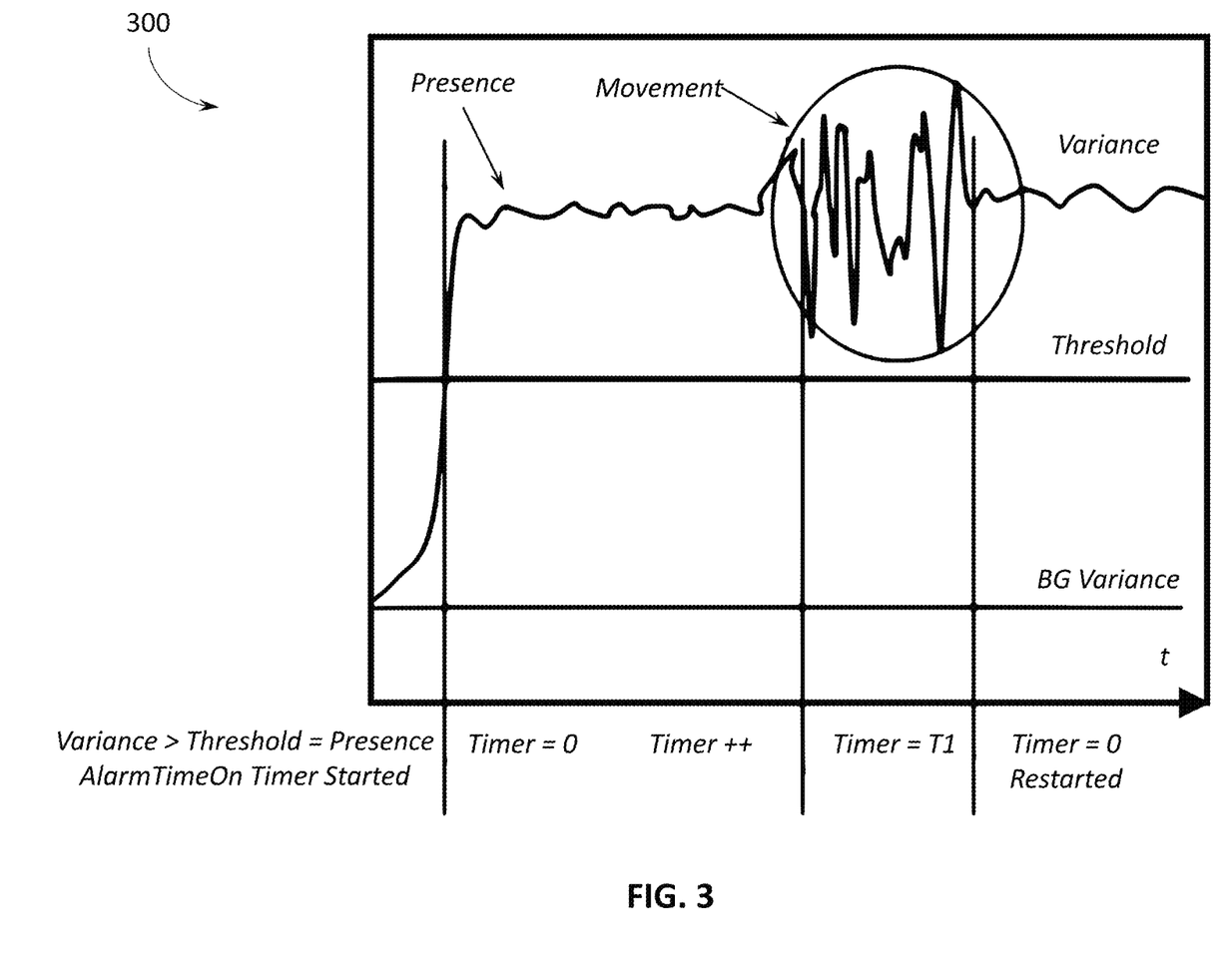
FIG. 3 illustrates an example data plot of micro-sensors over time, in accordance with one or more embodiments.

FIG. 3 illustrates an example data plot 300 of micro-sensor values over time, in accordance with one or more embodiments. As previously discussed, each micro-sensor may be defined as a state-machine. In some embodiments, a real-time variance of the pixel value (or in some embodiments, pixel values) at the micro-sensor location is calculated and the state of the micro-sensor is determined by the increase/decrease of the real-time variance, Variance, with respect to a background variance value, BG Variance. Detection at a micro-sensor point is triggered when there is an increase of the variance with respect to its background value. In some embodiments, a threshold, Threshold, is defined such that when Variance>Threshold, then the presence, Presence, of an object is detected at the micro-sensor. When Presence is detected, an alarm timer, AlarmTimeOn, is started and incremented while Presence is true. Wide swings in the Variance may indicate movement by the detected object. When a slight movement is detected the timer is restarted from zero. After a presence is steady for a continuous period of time greater than the threshold time, the stop alarm is triggered.

In some embodiments, the alarm is triggered when a stationary object is detected over an interval of time (e.g., 10 seconds). It will be appreciated that the micro-sensor approach described with reference to FIGS. 2 and 3 may be implemented in the traffic stop event detection component 130, the fallen object event detection component 140, and/or to detect a stopped/fallen object through the background modeling components 150.

Referring back to FIG. 1, after an alarm is triggered by one of the stop/fallen object algorithms, the corresponding background image is requested from the background modeling components 150 and sent to the corresponding DNN inference engine (e.g., stop validator 132 or fallen object validator 142). There can be one or more background algorithms configured to run on the device, including a slow background algorithm and a fast background algorithm. The slow background algorithm is less sensitive and takes more time (1-10 minutes) to learn a stopped object in the scene in contrast to a fast background algorithm which takes significantly less time (5-10 seconds) to learn a stopped object in the scene. The two algorithms are complementary, for instance the slow background algorithm can be used to filter out slow moving traffic as in the case of a traffic jam, while the fast background algorithm is suitable for quickly detecting a moving object that comes to a halt.

Figure 4A:
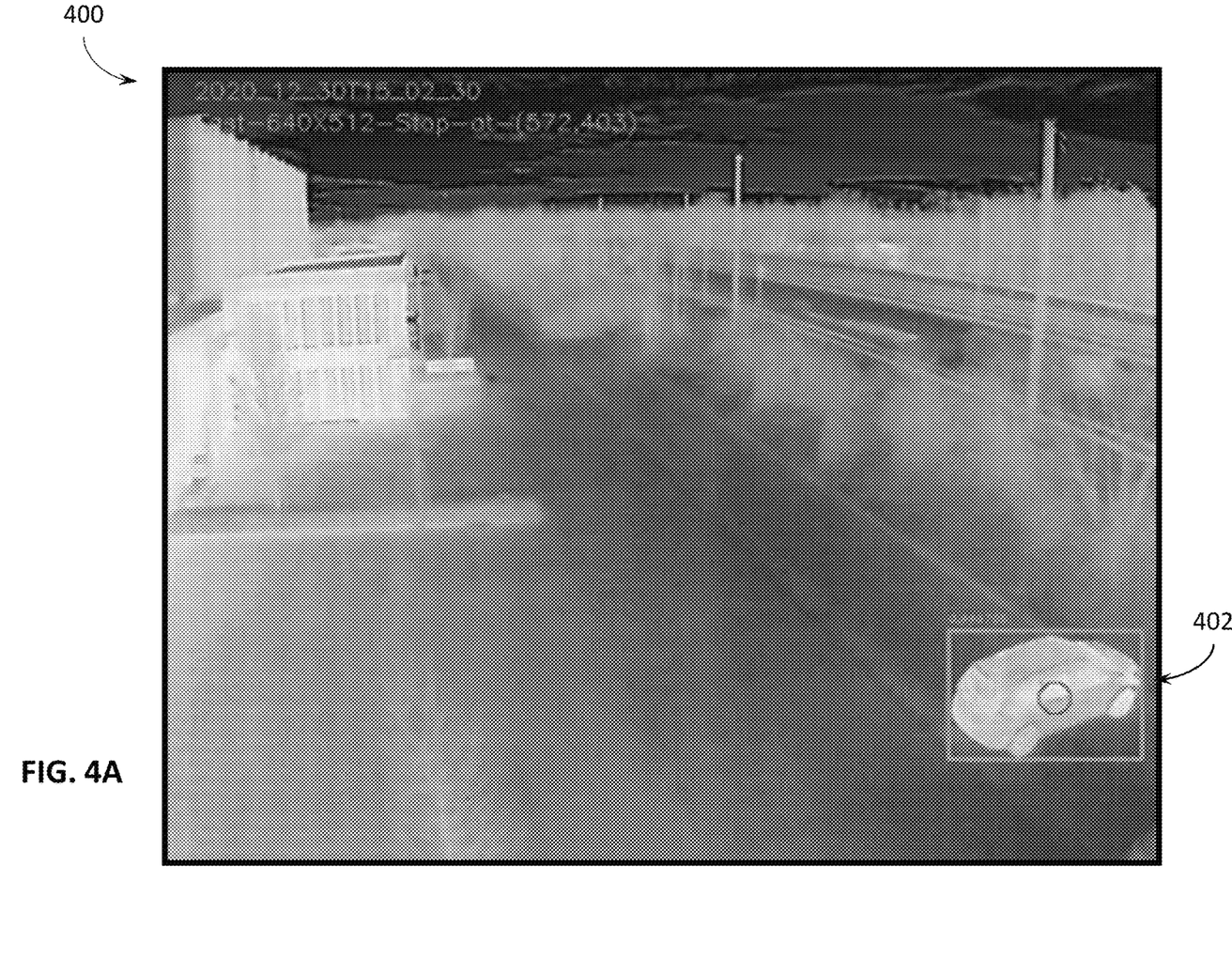
FIG. 4A illustrates an example fast background image, in accordance with one or more embodiments.
Figure 4B:
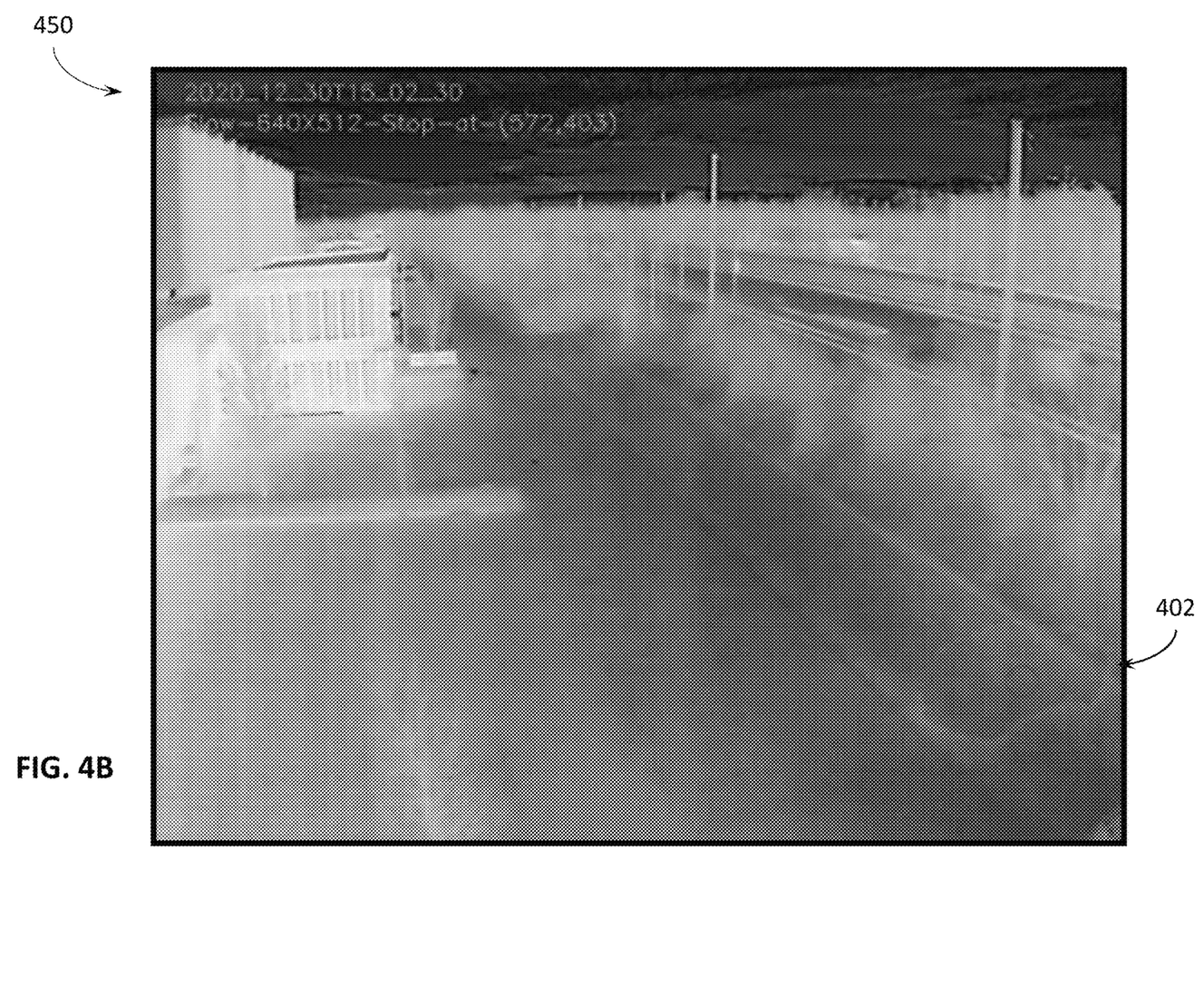
FIG. 4B illustrates an example slow background image, in accordance with one or more embodiments.

Referring to FIGS. 4A and 4B, example fast background and slow background images are illustrated, in accordance with one or more embodiments. FIG. 4A illustrates a fast background image 400, 5 seconds after a vehicle 402 stops in the captured scene. FIG. 4B illustrates a slow background image 450, 5 seconds after the vehicle 402 stops in the captured scene. As illustrated, the fast background image 400 will quickly integrate a stopped object into the background, while the slow background image 450 will not integrate the stopped object until more time has passed.

Referring back to FIG. 1, the appropriate DNN inference engine receives both the background image(s) (from the background modeling algorithm 150) and the coordinates (or other location data) associated with the stopped object in the scene (from the stop/fallen object algorithm). The object detector acquires the locations of all the objects in the background image and verifies if there is an object bounding box overlapping with the location notified by the stop/fallen object algorithm. In the event of successful verification of the alarm, an alert may then be sent to another system, for instance a traffic controller system 160, for implementing an appropriate response.

The systems and methods disclosed herein are designed to provide an efficient and robust traffic monitoring system for detecting stopped traffic and/or fallen objects in a traffic scene. Stopped vehicle detection is a component of many traffic anomaly detection systems and is known to be a common source of false alarms due to sensitivity of the detection algorithms. The systems disclosed herein employ a sensitive stopped traffic detection algorithm followed by a false alarm validation system that includes stopped traffic/fallen object background modeling and specially trained DNN inference model(s). In some embodiments, the DNN inference model is run using a slowly updated background image of a busy traffic scene to provide stable validation results because fewer stopped objects will be contained in the background scene.

These approaches complement a variety of stopped vehicle and fallen object detection algorithms that may be prone to false alarms. The systems disclosed herein are capable of running on most traffic processing systems, such as edge devices associated with roadside cameras. The disclosed system is modular with its subcomponents decoupled from each other allowing the system designers to fine-tune each component separately for a desired application. The DNN inference engine can run locally on the camera hardware or on a cloud allowing the offloading of heavy deep-learning models from the camera hardware to a powerful server.

Figure 5:
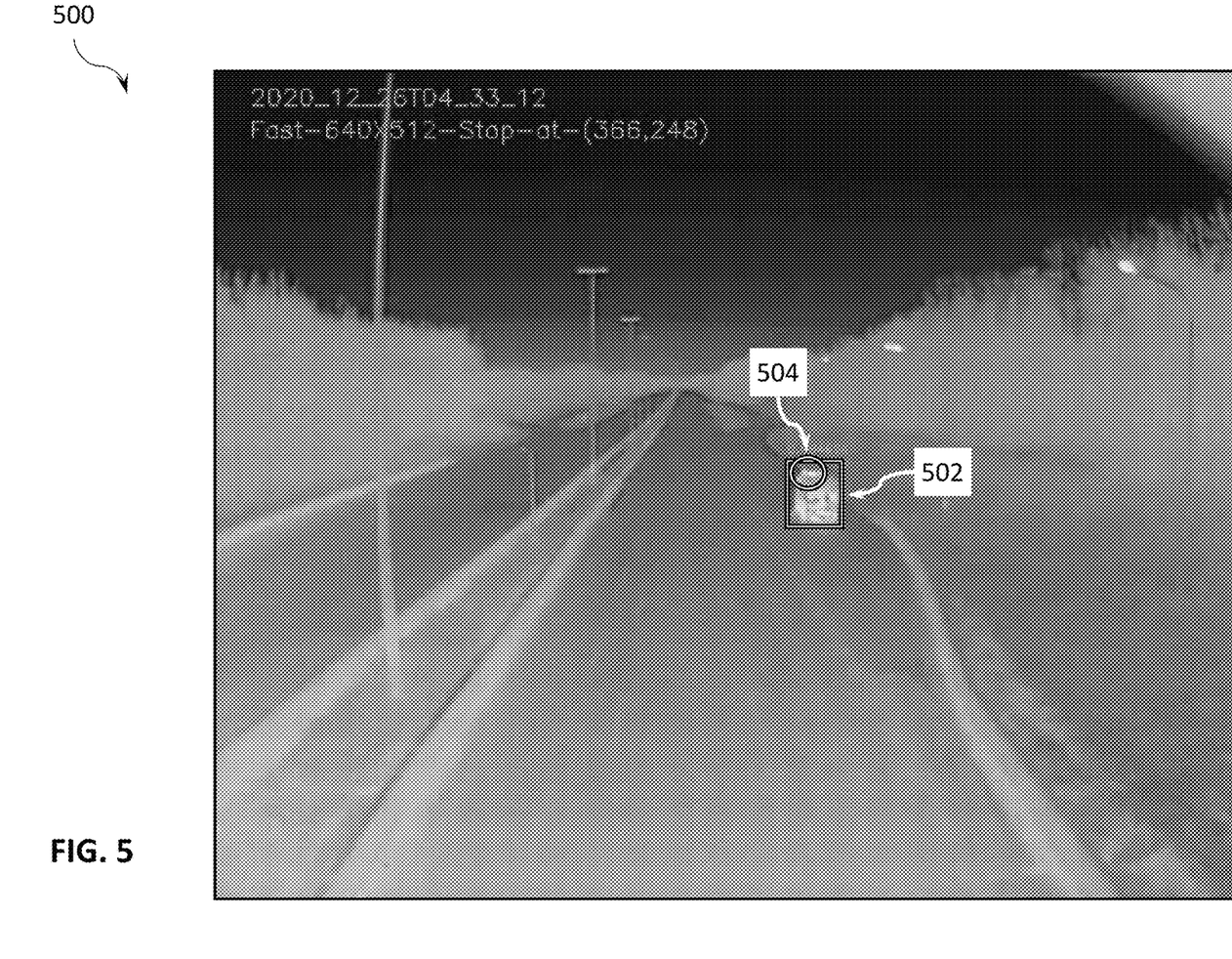
FIG. 5 is an example image of a stopped vehicle verification, in accordance with one or more embodiments.
Figure 6A:
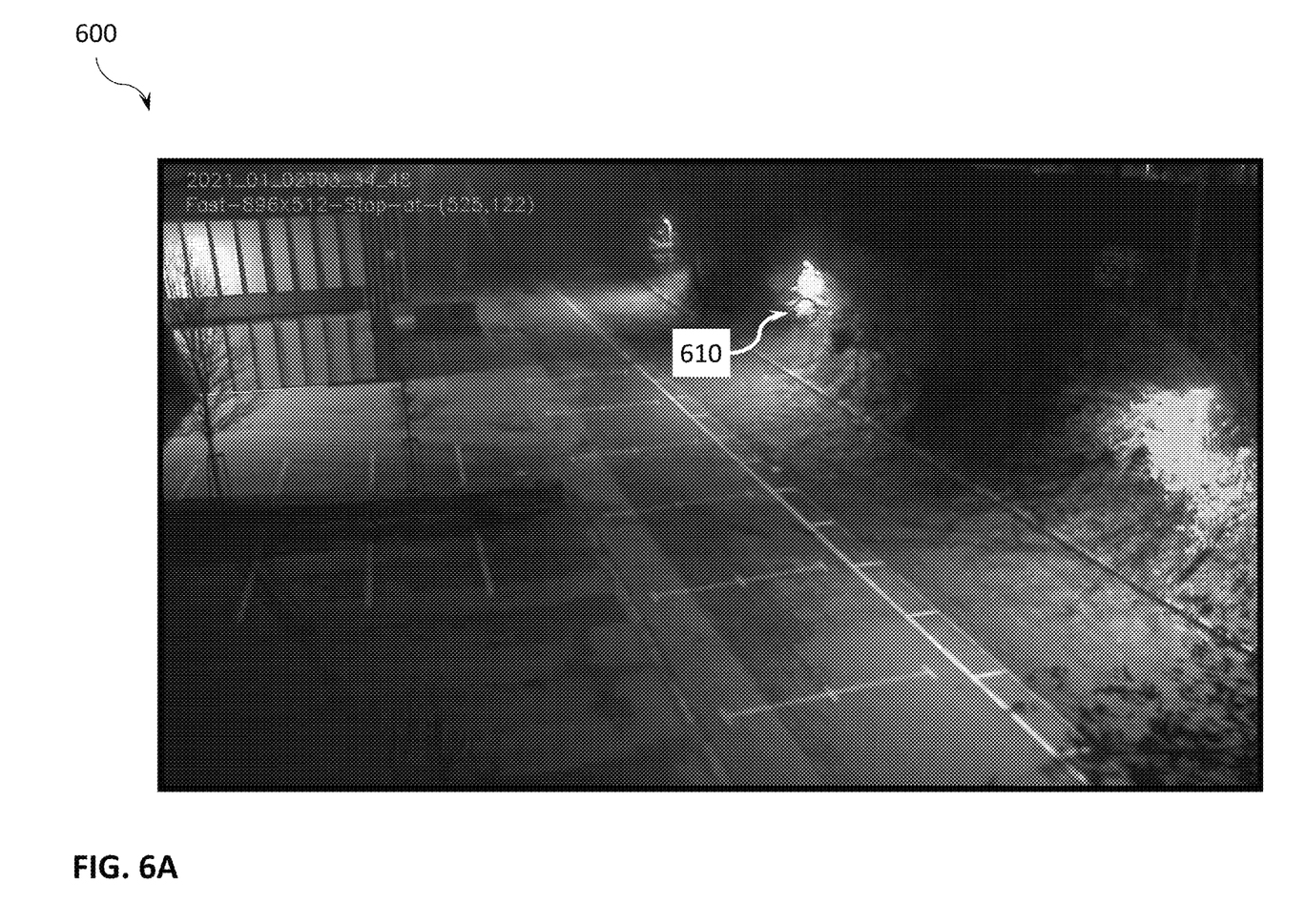
FIG. 6A is an example image of a false alarm triggered by a streetlight, in accordance with one or more embodiments.
Figure 6B:
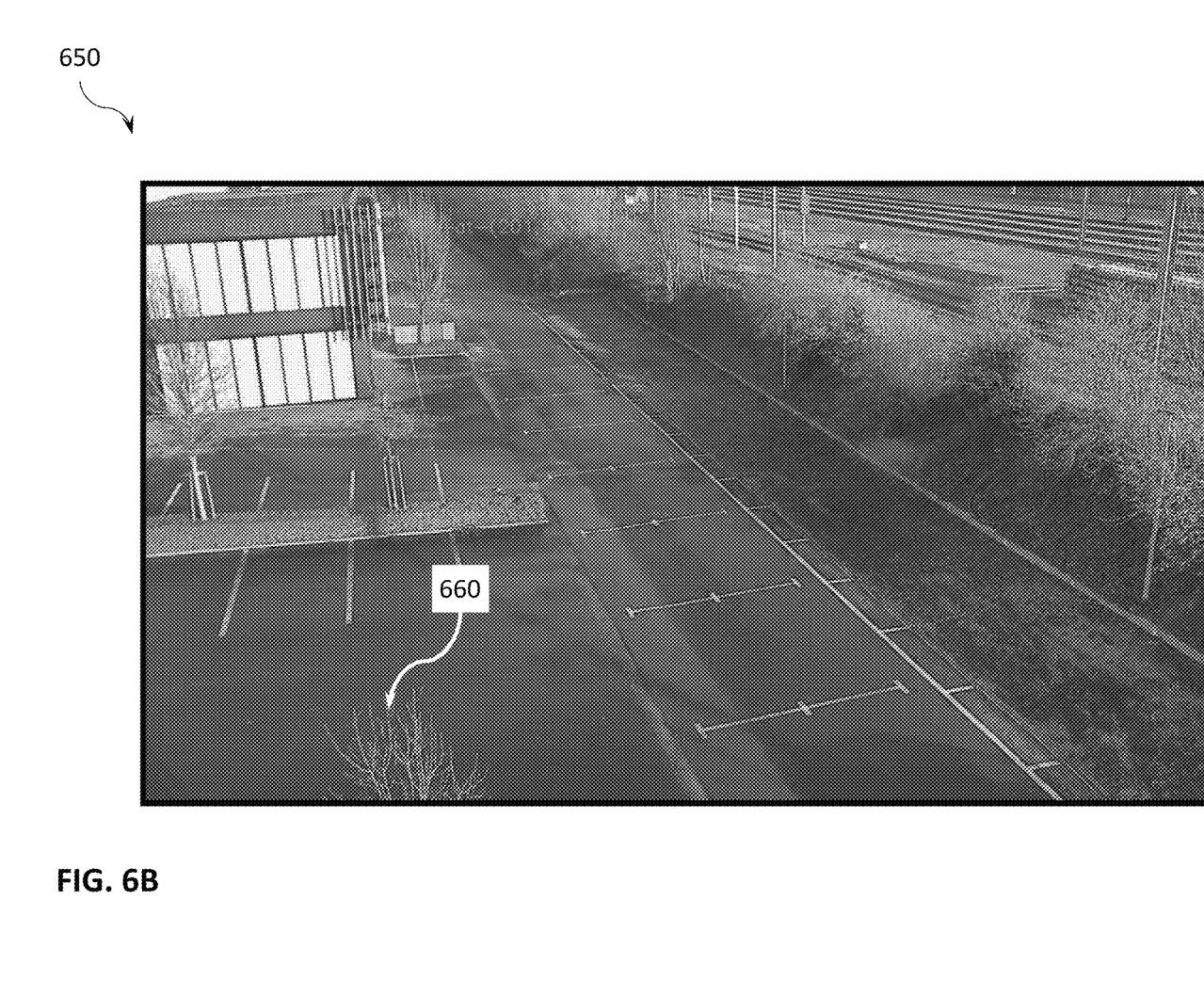
FIG. 6B is an example image of a false alarm triggered by moving trees, in accordance with one or more embodiments.

Further examples will now be described with reference to FIGS. 5, 6A and 6B. FIG. 5 is an image of a scene 500, including a vehicle stopped on the side of a motorway which is detected by the traffic stop algorithm. The corresponding background image is sent to the DNN inference engine for validating the alarm. The DNN bounding-box (rectangle 502) overlaps with the stop location (circle 504) thus validating the stop alarm. FIG. 6A is an example image showing a false alarm condition based on a streetlight turning on (reference 610). FIG. 6B is an example image 650 showing a false alarm condition based on waving trees (reference 660). In FIGS. 6A and 6B, an alarm is triggered, and the corresponding background images are sent to the DNN inference engine for validating the alarms. However, the DNN inference engine does not detect any objects at the alarm locations (e.g., no bounding boxes in images 600 or 650 that overlap with the alarm). As a result, the DNN inference engine suppresses the alarms.

Figure 7:
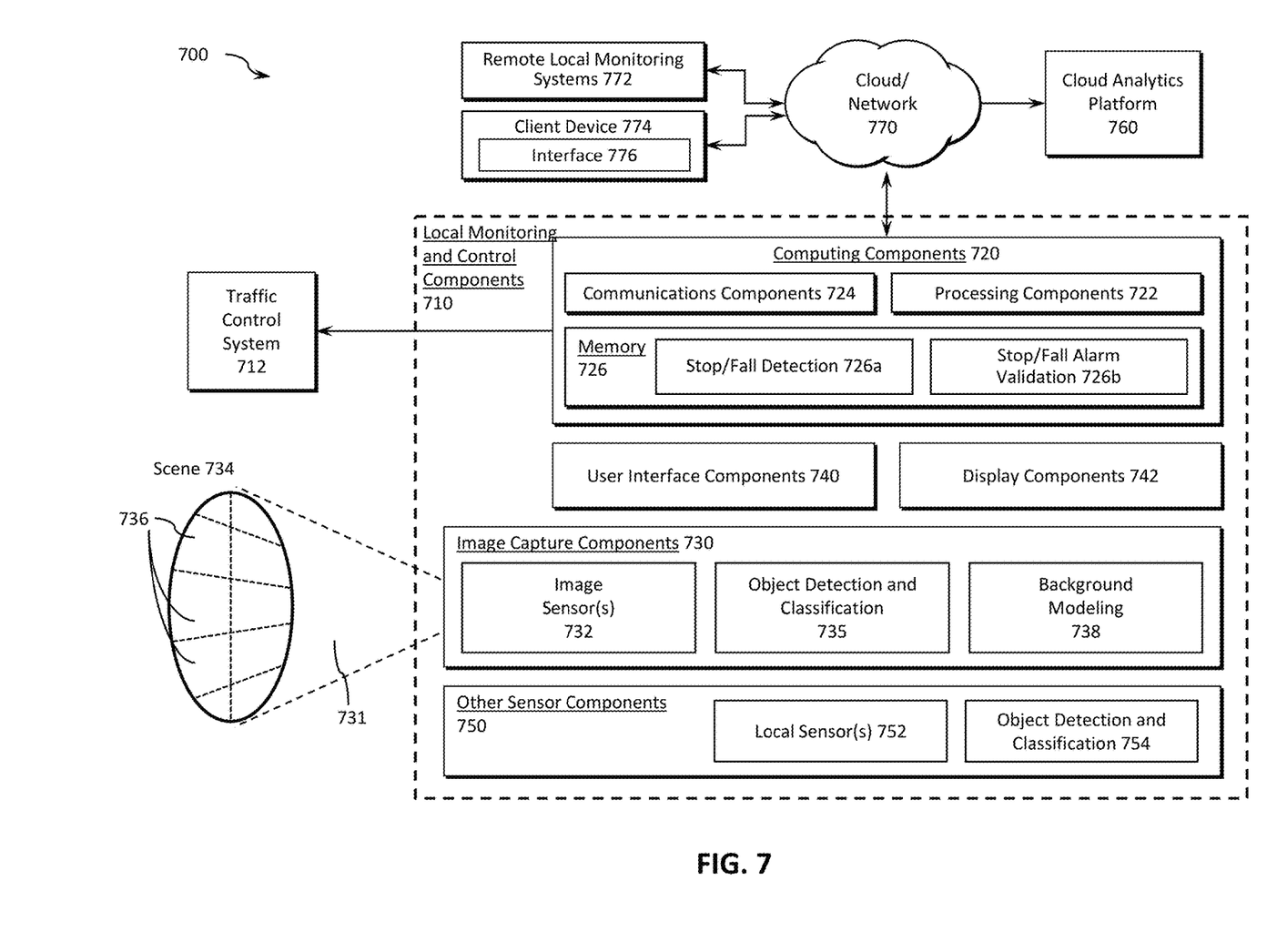
FIG. 7 illustrates an example stopped vehicle/fallen object alarm and validation system, in accordance with one or more embodiments.

Referring to FIG. 7, an example alarm verification system implementing various aspects of the present disclosure will now be described, in accordance with one or more embodiments. In some embodiments, an alarm verification system 700 includes local monitoring and control components 710 for monitoring a traffic region and/or controlling a traffic control system 712 associated with the traffic region (e.g., a system for controlling a traffic light at an intersection). The local monitoring and control components 710 may be implemented in one or more devices associated with a monitored traffic area, and may include various processing and sensing components, including computing components 720, image capture components 730, user interface components 740, display components 742, and/or other sensor components 750.

The image capture components 730 are configured to capture images of a field of view 731 of a traffic location (e.g., scene 734 depicting a monitored traffic region). The image capture components 730 may be configured for infrared imaging (e.g., thermal imaging), visible spectrum imaging, and/or other imaging. In some embodiments, the image capture components 730 include object detection and classification components 735 configured to process captured images in real-time to detect and classify desired objects such as vehicles, bicycles, pedestrians and/or other objects. In some embodiments, the image capture components 730 can be configured through a web browser interface and/or software which is installed on a client device (e.g., remote client device 774 with interface 776 and/or another system communicably coupled to the image capture components 730). The configuration may include configuring micro-sensors (such as micro-sensors 220 as described with regards to FIG. 2), defined detection zones 736 within the scene 734 (such as region of interest 210 as described with regards to FIG. 2) and system parameters. The image capture components 730 may also include background modeling components 738, configured to model a plurality of background images of the scene 734, spanning various time intervals for the background capture (e.g., 5 seconds, 10 minutes, etc.).

In some embodiments, object tracking may be implemented using image processing and computer vision techniques as known in the art, including a pixel tracker configured to monitor changes in pixel values (e.g., contrast). The system may trigger the stop event based on detected changes in the pixel values that exceed certain threshold conditions. In other embodiments, the object tracker may be configured to track and classify objects from the sensor data and may include a neural network configured to receive captured image data and output an object classification, confidence factor, and/or object location in a corresponding captured image.

When an object passes into a detection zone 736, the image capture components 730 may detect and/or classify the object. In a traffic monitoring system, the system may be configured to determine if an object is a pedestrian, bicycle or vehicle. If the object is a vehicle or other object of interest, further analysis may be performed on the object to determine a further classification of the object (e.g., vehicle type) based on shape, height, width, thermal properties and/or other detected characteristics. The system is further configured to determine whether traffic has stopped and/or an object has fallen in a traffic lane, for example by detecting a stationary vehicle and/or fallen object as described herein with respect to FIGS. 1-6B.

In various embodiments, the image capture components 730 include one or more image sensors 732, which may include visible light, infrared, and/or other imaging sensors. The object detection and classification components 735 detect, track and classify objects that appear in the captured images, and define a bounding box around a detected object's location in the image. In some embodiments, the object detection and classification object components 735 include one or more computer vision approaches as known in the art, including the configuring and monitoring micro-sensors as described herein. In other embodiments, a trained neural network is configured to output an identification of detected objects and associated bounding boxes, a classification for each detected object, and a confidence level for classification. In some embodiments, the image capture components include multiple cameras (e.g., a visible light camera and a thermal imaging camera).

In various embodiments, the local monitoring and control components 710 further include other sensor components 750, which may include feedback from other types of traffic sensors (e.g., radar system, a roadway loop sensor) and/or object sensors, which may include wireless systems, sonar systems, LiDAR systems, and/or other sensors and sensor systems. The other sensor components 750 include local sensors 752 for sensing traffic-related phenomena and generating associated data, and associated object detection and classification modules 754, which may include a neural network configured to detect and track objects in the sensor data and output object location and/or classification information (e.g., a bounding box around a detected object).

In some embodiments, the various sensor systems 730 and 750 are communicably coupled to the computing components 720 and/or the traffic control system 712 (such as an intersection controller). The computing components 720 are configured to provide additional processing and facilitate communications between various components of the alarm verification system 700. The computing components 720 may include processing components 722, communication components 724 and a memory 726, which may include program instructions for execution by the processing components 722. For example, the computing components 720 may be configured to process data received from the image capture components 730 and other sensor components 750. The computing components 720 may be configured to communicate with a cloud analytics platform 760 or another networked server or system (e.g., remote local monitoring systems 772) to transmit local data for further processing. The computing components 720 may be further configured to receive processed traffic data associated with the scene 734, traffic control system 712, and/or other traffic control systems and local monitoring systems in the region. The computing components 720 may be further configured to generate and/or receive traffic control signals for controlling the traffic control system 712.

In various embodiments, the memory 726 stores program instructions to cause the processing components 722 to perform the processes disclosed herein. For example, the memory 726 may include instructions to facilitate (i) stopped traffic detection and fallen object detection algorithms 726a (e.g., as described with reference to FIGS. 1-6), and (ii) stopped traffic alarm validation and fallen object alarm validation algorithms 726b. (e.g., as described with reference to FIGS. 1-6).

The computing components 720 and other local monitoring and control components 710 may be configured to combine local detection of pedestrians, cyclists, vehicles and other objects for input to the traffic control system 712 with data collection that can be sent in real-time to a remote processing system (e.g., the cloud 770) for analysis and integration into larger system operations. In some embodiments, the local monitoring and control components 710 include user interface components (e.g., keyboard, pointing interface, graphical user interface, touch screen device) and display components 742 (e.g., a display screen, display of a touch screen device), allowing user access to traffic information, object data, situational maps, configuration interfaces, and other features of the alarm verification system 700. In some embodiments, the user interface components 740, display components 742 and associated applications (e.g., algorithms 726a-b) may reside on a separate device, such as portable computing device, smart phone, laptop computer, or other device communicably coupled (e.g., wired, optical, wireless or other communication coupling) or remote system, such as remote client device 774.

In some embodiments, a system includes an image sensor configured to capture a stream of images of a scene, an object tracker configured to identify an object in the captured images and define an associated object location in the captured images, a stopped traffic detector configured to trigger a stop event if an object in the stream of images is determined to be stationary, a background modeling system, configured to generate at least one background image of the scene, and a stop validator configured to, in response to receiving notification of a stop event, confirm that a location that triggered the stop event is associated with a detected stationary object.

The image sensor may include a visible light sensor configured to generate a stream of visible light images of the scene and/or a thermal image sensor configured to generate a stream of thermal images of the scene. The object tracker is further configured to classify the identified objects and may include a neural network configured to receive captured image data and output an object classification, confidence factor, and/or object location in a corresponding captured image.

In some embodiments, the background modeling system is configured to receive a stream of input image frames and generate a plurality of background images comprising substantially static portions of the image. The plurality of background images may include a first background image tracking a background over a first period of time and a second background image tracking a background over a second period of time, wherein the first period of time is less than the second period of time.

In some embodiments, the system may further include a fallen object event detector configured to trigger a stop event if an object in the stream of images is determined to be stationary. The stop validator may be implemented as a trained neural network model configured to, in response to a stop event, validate the stop event by detecting a stationary object at the location of the stop event. The stopped traffic detector may be further configured to define a region of interest in the image of the scene and configure a plurality of micro-sensors in the region of interest, wherein each micro-sensor is implemented as a state machine. The stop event may be triggered if a presence of a stationary object is detected in the region of interest based at least in part on variance values of the micro-sensors within a bounding box of the stationary object.

Figure 8:
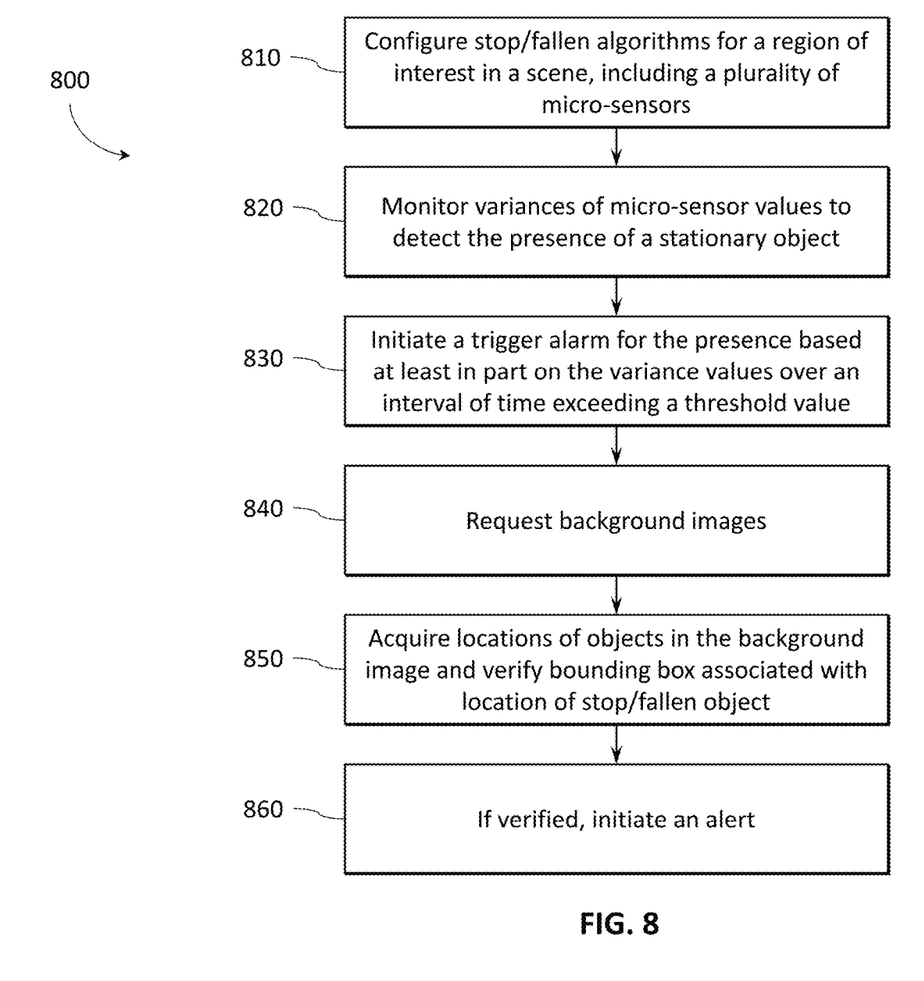
FIG. 8 illustrates an example process for operating a stopped vehicle/fallen object validation system, in accordance with one or more embodiments.

Referring to FIG. 8, an example process for operating a stopped vehicle/fallen object detection system will now be described in accordance with one or more embodiments. The process 800 may be implemented by the systems described in FIGS. 1 and 7, or other computing system(s) adapted to perform the steps described herein. In step 810, the stopped traffic detection algorithm and fallen object detection algorithm are configured for a region of interest in a scene captured by one or more image capture devices (e.g., image capture system 110, image capture components 730, or other image capture device). In some embodiments, one or more regions of interest in the scene are defined and monitored. In some embodiments, the regions of interest include a plurality of micro-sensors arranged to cover the region of interest (e.g., as depicted in FIG. 2) and detect a trigger event associated with a stationary object.

In step 820, the system monitors the variances of the micro-sensor values to detect the presence of a stationary object in the region of interest. In step 830, the system initiates a trigger alarm for the presence based at least in part on the variance values over an interval of time exceeding a threshold value (e.g., as depicted in the plot of FIG. 3). In some embodiments, the system may be configured with a conventional stopped vehicle detection algorithm or fallen object detection algorithm as known in the art. In step 840, in response to alarm the appropriate DNN requests one or more background images from the background modeling algorithm. In step 850, the system acquires locations of objects in the background image(s) and verifies whether a bounding box is associated with the alarm trigger location. In step 860, an alert is initiated if the alarm trigger is validated.

In various embodiments, a method includes capturing a stream of images of a scene, identifying, using an object tracker, an object in the captured stream of images, triggering, by a stopped traffic detector, a stop event if an object in the stream of images is determined to be stationary, modeling at least one background image of the scene, and confirming, by a stop validator in response to receiving notification of the stop event, that a location that triggered the stop event is associated with a detected stationary object.

In some embodiments, the stream of capture images may include visible light images of the scene and/or infrared images of the scene. The object tracker may be implemented as a neural network configured to receive captured image data and output an object classification, confidence factor, and/or object location in a corresponding captured image.

In some embodiments, modeling at least one background image of the scene further includes receiving a stream of input image frames and generating a plurality of background images comprising substantially static portions of the image. The plurality of background images may include a first background image tracking a background over a first period of time and a second background image tracking a background over a second period of time; wherein the first period of time is less than the second period of time.

The method may further include detecting a fallen object event and triggering a stop event if an object in the stream of images is determined to be stationary. The stop validator may include a trained neural network model configured to, in response to a stop event, validate the stop event by detecting a stationary object at the location of the stop event. The stopped traffic detector may be further configured to define a region of interest in the image of the scene, wherein the method further comprises configuring a plurality of micro-sensors in the region of interest, wherein each micro-sensor is implemented as a state machine. The method may further include triggering the stop event if a presence of a stationary object is detected in the region of interest based at least in part on variance values of the micro-sensors within a bounding box of the stationary object.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein. Embodiments described above illustrate but do not limit the invention. It should also be understood that numerous modifications and variations are possible in accordance with the principles of the invention. Accordingly, the scope of the invention is defined only by the following claims.

What is claimed:

1. A system comprising:
  an image sensor at a fixed location and configured to capture a stream of images of a scene comprising one or more objects moving through the scene;
  an object tracker configured to identify the one or more objects moving through the scene in the stream of images and, for each identified object, define an associated object location in the stream of images;
  a stopped traffic detector configured to trigger a stop event if an identified object in the stream of images is determined to be stationary for a predetermined period of time;
  a background modeling system, configured to receive the stream of images and continually generate a plurality of background images of the scene comprising substantially static portions of the image, wherein the plurality of background images comprise a first background image tracking a background over a first period of time preceding a current image frame and a second background image tracking a background over a second period of time, greater than the first period of time, preceding the current image frame;
  a stop validator configured to, in response to the stop event, perform object detection based on a comparison of the first background image and the second background image to confirm that the associated object location in the stream of images that triggered the stop event corresponds with an object detected in the plurality of background images.

2. The system of claim 1, wherein the image sensor comprises a visible light sensor configured to generate a stream of visible light images of the scene and/or a thermal image sensor configured to generate a stream of thermal images of the scene.

3. The system of claim 1, wherein the object tracker comprises a pixel tracker configured to monitor changes in pixel values; and
  wherein the stop traffic detector is configured to trigger the stop event based on detected changes in the pixel values.

4. The system of claim 1, wherein the object tracker comprises a computer vision object tracker and/or a neural network configured to receive captured image data and output an object classification, confidence factor, and/or object location in a corresponding captured image.

5. The system of claim 1, wherein the system is incorporated in a traffic monitoring system; wherein the object tracker is configured to identify vehicles in the stream of images and monitor traffic.

6. The system of claim 1 further comprising a fallen object event detector configured to trigger a fallen object event if an object in the stream of images is determined to be stationary.

7. The system of claim 1, wherein the stop validator comprises a trained neural network model configured to, in response to a stop event, validate the stop event by detecting a stationary object in the plurality of background images at the corresponding location of the stop event.

8. The system of claim 1, wherein the stopped traffic detector is further configured to define a region of interest in the stream of images of the scene; and
configure a plurality of micro-sensors in the region of interest, wherein each micro-sensor is implemented as a state machine.

9. The system of claim 8, wherein the stop event is triggered if a presence of a stationary object is detected in the region of interest based at least in part on variance values of the micro-sensors within a bounding box of the stationary object.

10. A method comprising:
capturing, using an image sensor at a fixed location, a stream of images of a scene comprising one or more objects moving through the scene;
identifying, using an object tracker, an object moving through the scene in the stream of images;
triggering, by a stopped traffic detector, a stop event if an identified object in the stream of images is determined to be stationary for a predetermined period of time;
modeling, continually, a plurality of background images of the scene from the stream of images comprising substantially static portions of the image, wherein the plurality of background images comprise a first background image tracking a background over a first period of time preceding a current image frame and a second background image tracking a background over a second period of time, greater than the first period of time, preceding the current image frame;
confirming, by a stop validator in response to the stop event and based on a comparison of the first background image and the second background image, that the object that triggered the stop event corresponds with a location of a stationary object in the plurality of background images.

11. The method of claim 10, wherein the stream of images comprises visible light images of the scene and/or infrared images of the scene.

12. The method of claim 10, wherein identifying, using an object tracker, an object in the stream of images, further comprises monitoring a plurality of pixels to detect changes in pixel values that exceed a first threshold value; and
wherein triggering, by a stopped traffic detector, a stop event if an object in the stream of images is determined to be stationary, further comprises determining whether a grouping of the plurality of pixels having pixel values that exceed a second threshold.

13. The method of claim 10, wherein modeling the plurality of background images of the scene further comprises receiving the stream of images and continually generating the plurality of background images comprising substantially static portions of the image.

14. The method of claim 10 further comprising a detecting a fallen object event and triggering a stop event if an object in the stream of images is determined to be stationary.

15. The method of claim 10, wherein the stop validator comprises a trained neural network model configured to, in response to a stop event, validate the stop event by detecting a stationary object at the location of the stop event.

16. The method of claim 10, wherein the stopped traffic detector is further configured to define a region of interest in the stream of images of the scene; and
wherein the method further comprises configuring a plurality of micro-sensors in the region of interest, wherein each micro-sensor is implemented as a state machine.

17. The method of claim 16, further comprising triggering the stop event if a presence of a stationary object is detected in the region of interest based at least in part on variance values of the micro-sensors within a bounding box of the stationary object.

* * * * *